(12) United States Patent
Wang et al.

(10) Patent No.: US 9,046,751 B2
(45) Date of Patent: Jun. 2, 2015

(54) OPTICAL EXCITATION DEVICE, LIGHT SOURCE MODULE, AND PROJECTOR USING THE SAME

(71) Applicant: DELTA ELECTRONICS, INC., Taoyuan Hsien (TW)

(72) Inventors: Hui-Hsiung Wang, Taoyuan Hsien (TW); Yu-Hsuan Sha, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 168 days.

(21) Appl. No.: 13/912,855

(22) Filed: Jun. 7, 2013

(65) Prior Publication Data

US 2014/0168613 A1    Jun. 19, 2014

(30) Foreign Application Priority Data

Dec. 14, 2012  (TW) .............................. 101147403 A

(51) Int. Cl.
*G03B 21/20*    (2006.01)
*H04N 9/31*    (2006.01)

(52) U.S. Cl.
CPC .......... *G03B 21/204* (2013.01); *G03B 21/2033* (2013.01); *H04N 9/3161* (2013.01)

(58) Field of Classification Search
CPC .. G03B 21/20; G03B 21/2033; G03B 21/204; H04N 9/31; H04N 9/3161
USPC ............ 353/31, 84–85, 94; 362/84, 230–231, 362/235–236; 359/885, 887, 889–892
See application file for complete search history.

(56) References Cited

U.S. PATENT DOCUMENTS

| | | | | |
|---|---|---|---|---|
| 6,874,892 | B1* | 4/2005 | McDaniel | 353/84 |
| 8,038,299 | B2* | 10/2011 | Inoue | 353/31 |
| 8,167,440 | B2* | 5/2012 | Sato et al. | 353/99 |
| 8,342,697 | B2* | 1/2013 | Iwanaga | 353/94 |
| 8,393,741 | B2* | 3/2013 | Fukano | 353/85 |
| 8,596,795 | B2* | 12/2013 | Akiyama | 353/38 |
| 8,616,710 | B2* | 12/2013 | Fukano | 353/85 |
| 2004/0057022 | A1* | 3/2004 | Song | 353/84 |
| 2007/0076174 | A1* | 4/2007 | Gerets et al. | 353/84 |
| 2009/0034284 | A1* | 2/2009 | Li et al. | 362/554 |
| 2011/0051102 | A1* | 3/2011 | Ogura et al. | 353/85 |
| 2013/0002972 | A1* | 1/2013 | Tanaka | 349/8 |
| 2013/0235349 | A1* | 9/2013 | Hsu | 353/7 |
| 2013/0235352 | A1* | 9/2013 | Hsu et al. | 353/31 |

* cited by examiner

*Primary Examiner* — Jori S Reilly-Diakun
(74) *Attorney, Agent, or Firm* — Lowe Hauptman & Ham, LLP

(57) ABSTRACT

An optical excitation device for exciting a laser light source includes a wavelength converter and a moving element. The laser light source emits a first light beam. The wavelength converter includes a wheel, a motor connected to the wheel, and a wavelength converting layer disposed on a light receiving surface of the wheel for converting the first light beam with the first wavelength into a second light beam with a second wavelength. The moving element is connected to the wavelength converter for moving the wavelength converter relative to the laser light source. There is a first reaction area between the laser light source and the wavelength converter when only the motor is operated, there is a second reaction area between the laser light source and the wavelength converter when both the motor and the moving element are operated, and the second reaction area is greater than the first reaction area.

20 Claims, 11 Drawing Sheets

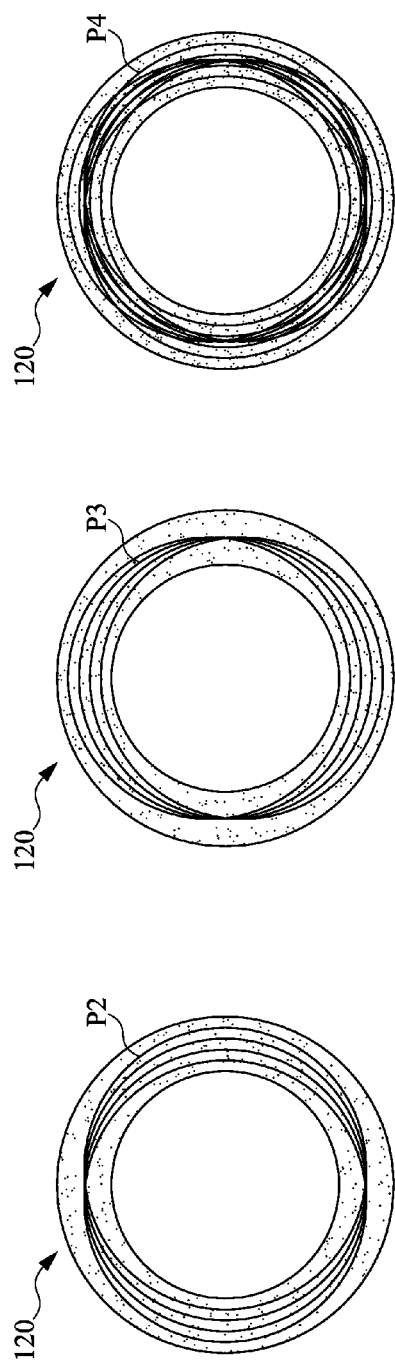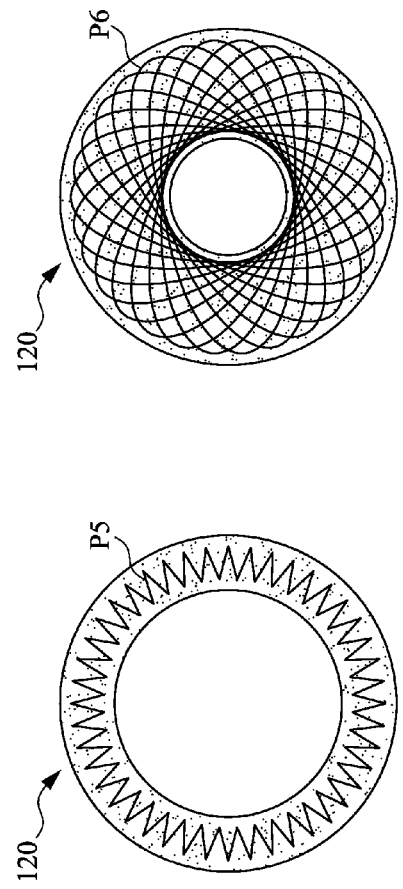

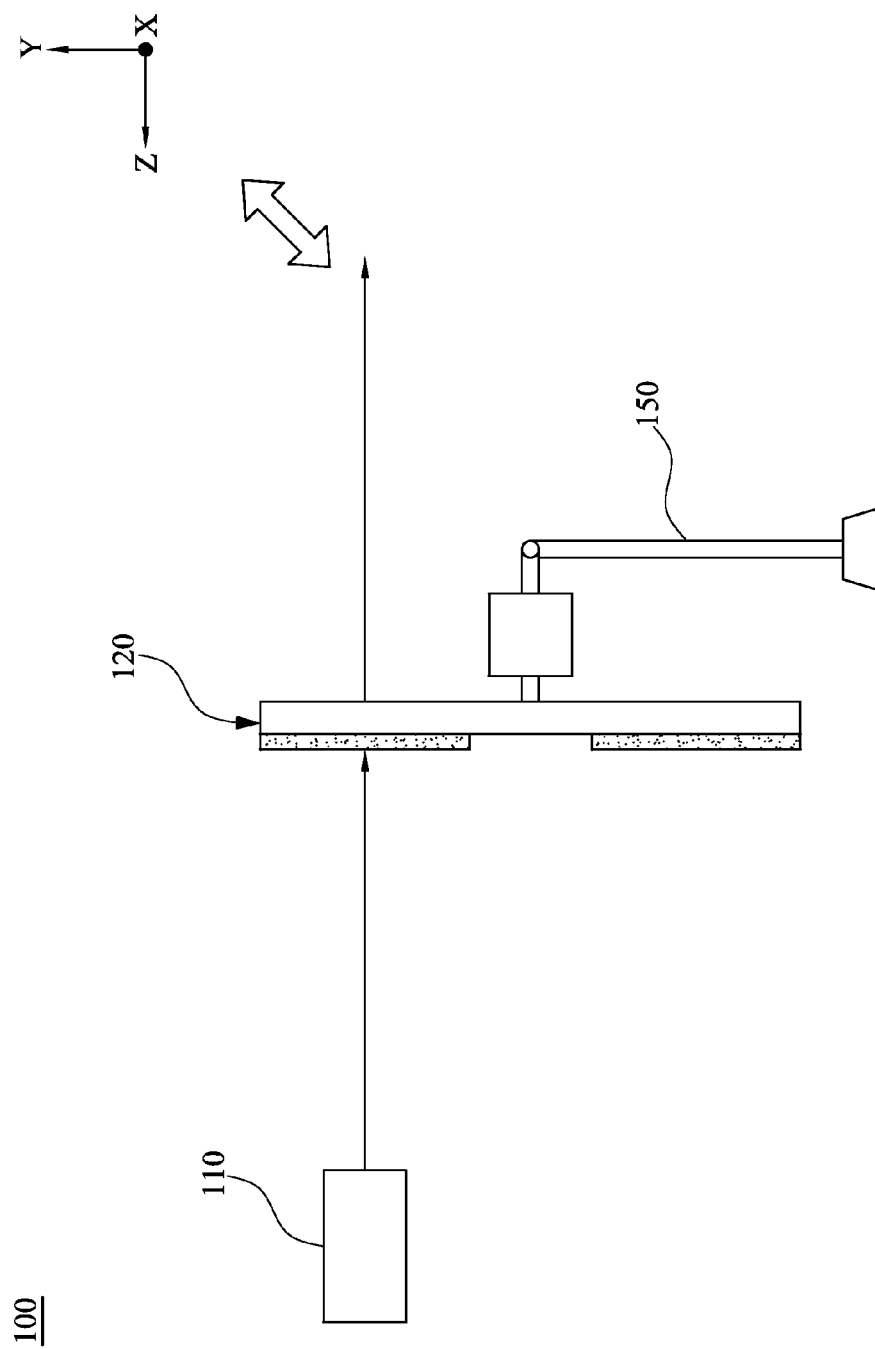

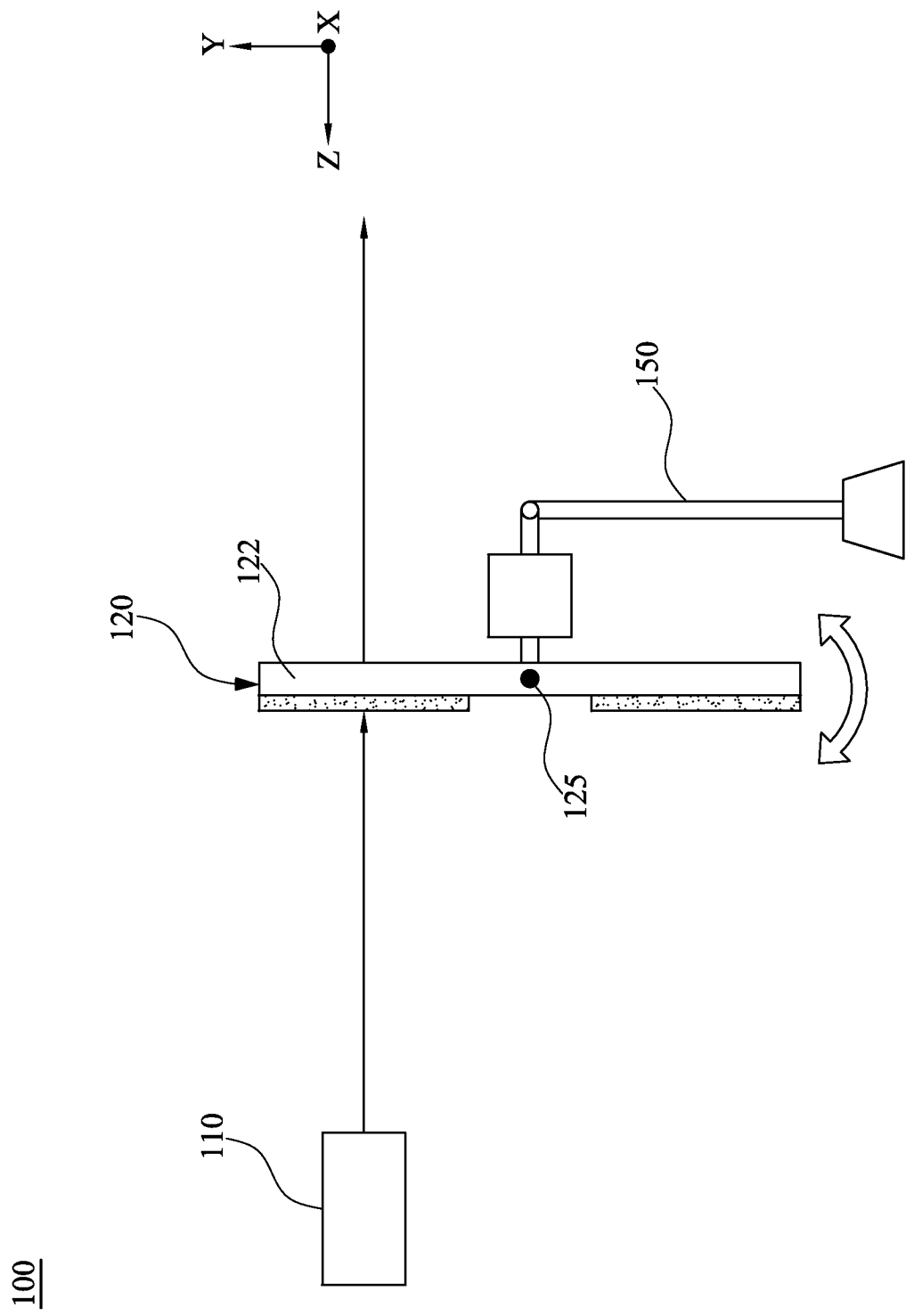

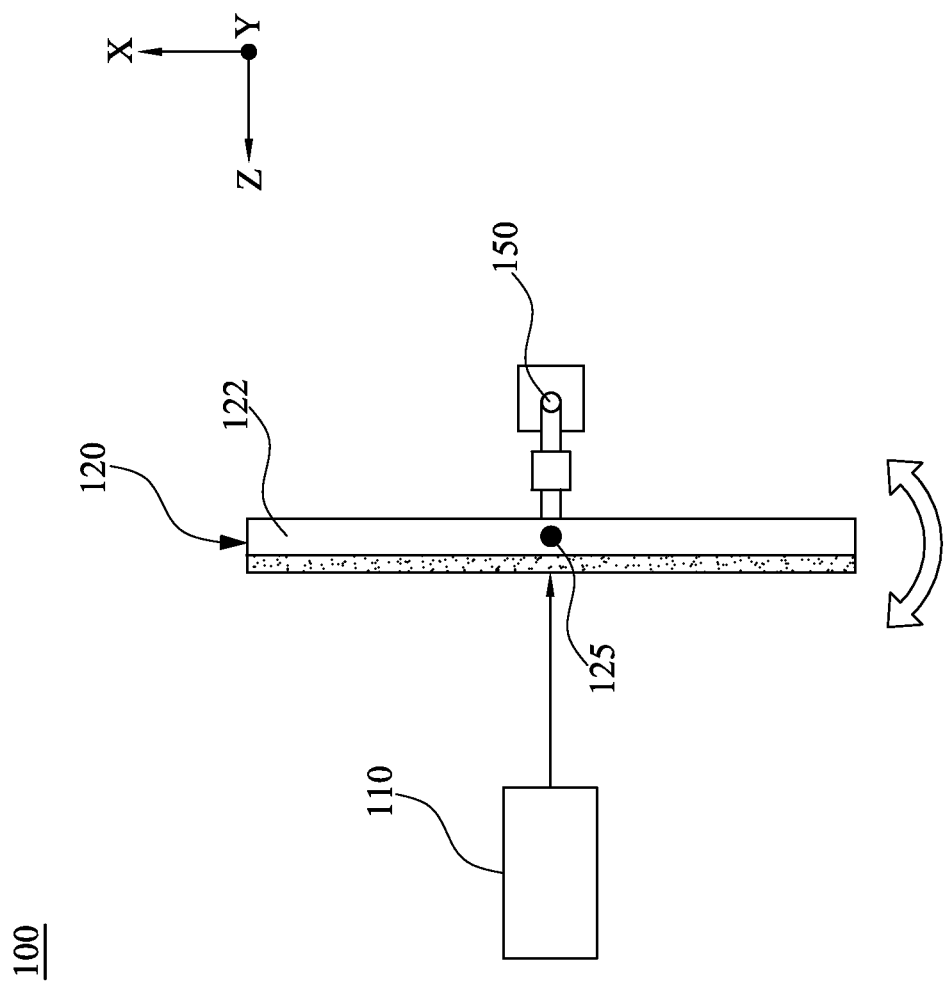

OPTICAL EXCITATION DEVICE, LIGHT SOURCE MODULE, AND PROJECTOR USING THE SAME

RELATED APPLICATIONS

This application claims priority to Taiwan Application Serial Number 101147403, filed Dec. 14, 2012, which is herein incorporated by reference.

BACKGROUND

1. Field of Invention

The present invention relates to an optical excitation device. More particularly, the present invention relates to an optical excitation device utilized in a projector.

2. Description of Related Art

Optical projectors have been applied in many fields since first being developed. They serve an expanded range of purposes, from use in consumer products to use in high-tech devices. For example, optical projectors may be used in projective systems for projecting enlarged images to facilitate the giving of presentations during conferences, or they may be used in projection screens or televisions for projecting and displaying real-time images.

A conventional projector typically includes a light source module and an image processor. The light emitted from the light source module is collected by optical components and is processed by a filter and a color wheel. The processed light is supplied to the image processor and subsequently projected onto a projection screen.

With the continued development of projectors, a laser light source and a phosphor wheel are now utilized in the light source module for providing light beams with various wavelengths. However, the energy carried by the laser light beam is high and focused, and as a result, the temperature of the wheel may reach up to 1000° C. after receiving the laser light beam for a period of time. Therefore, the phosphor on the phosphor wheel may be damaged. As brightness requirements for projectors continue to increase, so does the energy carried by laser light beams generated therein. Hence, the problem of phosphor damage due to high temperatures is becoming increasingly severe.

SUMMARY

The invention provides an optical excitation device with enhanced thermal dissipating efficiency.

An aspect of the invention provides an optical excitation device for exciting a laser light source. The laser light source emits a first light beam having a first wavelength. The optical excitation device includes a wavelength converter and a moving element. The wavelength converter includes a wheel, a motor connected to the wheel for driving the wheel to rotate relative to the laser light source, and a wavelength converting layer disposed on a light receiving surface of the wheel for converting the first light beam with the first wavelength into a second light beam with a second wavelength. The moving element is connected to the wavelength converter for moving the wavelength converter relative to the laser light source. There is a first reaction area between the laser light source and the wavelength converter when the motor is operated and the moving element is not operated, there is a second reaction area between the laser light source and the wavelength converter when both the motor and the moving element are operated, and the second reaction area is greater than the first reaction area.

In one or more embodiments, a projection path of the laser light source on the wavelength converter is located within a coating area of the wavelength converting layer.

In one or more embodiments, the wheel comprises a front surface, a back surface, and a side surface connecting the front surface and the back surface, the motor is disposed at the back surface, and the light receiving surface is the front surface.

In one or more embodiments, the light receiving surface is arranged perpendicular to a light emitting direction of the laser light source.

In one or more embodiments, the light receiving surface is arranged obliquely to a light emitting direction of the laser light source.

In one or more embodiments, the moving element is a robot arm for swinging the wheel relative to the laser light source.

In one or more embodiments, the wheel comprises a front surface, a back surface, and a side surface connecting the front surface and the back surface, the motor is disposed at the back surface, and the light receiving surface is the side surface.

In one or more embodiments, the wavelength converter has a rotation cycle and a movement cycle, and the movement cycle is less than or greater than an integer multiple of the rotation cycle.

In one or more embodiments, a light emitting direction of the laser light source is along a z-axis direction, and a center of the wheel is at least moved on an x-y plane.

Another aspect of the invention provides a light source module. The light source module includes a laser light source and an optical excitation device. The laser light source emits a first light beam having a first wavelength. The optical excitation device includes a wavelength converter and a moving element. The wavelength converter includes a wheel, a motor connected to the wheel for driving the wheel to rotate relative to the laser light source, and a wavelength converting layer disposed on a light receiving surface of the wheel for converting the first light beam with the first wavelength into a second light beam with a second wavelength. The moving element is connected to the wavelength converter for moving the wavelength converter relative to the laser light source. There is a first reaction area between the laser light source and the wavelength converter when the motor is operated and the moving element is not operated, there is a second reaction area between the laser light source and the wavelength converter when both the motor and the moving element are operated, and the second reaction area is greater than the first reaction area.

In one or more embodiments, a projection path of the laser light source on the wavelength converter is located within a coating area of the wavelength converting layer.

In one or more embodiments, the wheel comprises a front surface, a back surface, and a side surface connecting the front surface and the back surface, the motor is disposed at the back surface, and the light receiving surface is the front surface.

In one or more embodiments, the light receiving surface is arranged perpendicular to a light emitting direction of the laser light source.

In one or more embodiments, the light receiving surface is arranged obliquely to a light emitting direction of the laser light source.

In one or more embodiments, the moving element is a robot arm for swinging the wheel relative to the laser light source.

In one or more embodiments, the wheel comprises a front surface, a back surface, and a side surface connecting the front surface and the back surface, the motor is disposed at the back surface, and the light receiving surface is the side surface.

In one or more embodiments, the wavelength converter has a rotation cycle and a movement cycle, and the movement cycle is less than or greater than an integer multiple of the rotation cycle.

In one or more embodiments, a light emitting direction of the laser light source is along a z-axis direction, and a center of the wheel is at least moved on an x-y plane.

Another aspect of the invention provides a projector utilizing the optical excitation device.

Another aspect of the invention provides a projector utilizing the light source module.

The projection path of the laser light source on the wavelength converter can be expanded by moving the wavelength converter relative to the laser light source. Therefore, the reaction area between the laser light source and the wavelength converter can be enlarged, and the wavelength converting layer can be utilized more efficiently. The energy carried by the laser light beam can be distributed on the wavelength converter more equally, thereby increasing the thermal dissipating efficiency of the wavelength converter. Moreover, a situation in which the wavelength converting layer is damaged due to high temperatures can be prevented.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 4A to FIG. 4E are schematic diagrams for describing different embodiments of a projection path of the laser light source on the wavelength converter of the invention;

FIG. 5A to FIG. 5C are side views of different embodiments of the light source module of the invention;

FIG. 5D to FIG. 5E are top views of different embodiments of the light source module of the invention;

DESCRIPTION OF THE EMBODIMENTS

Figure 1:
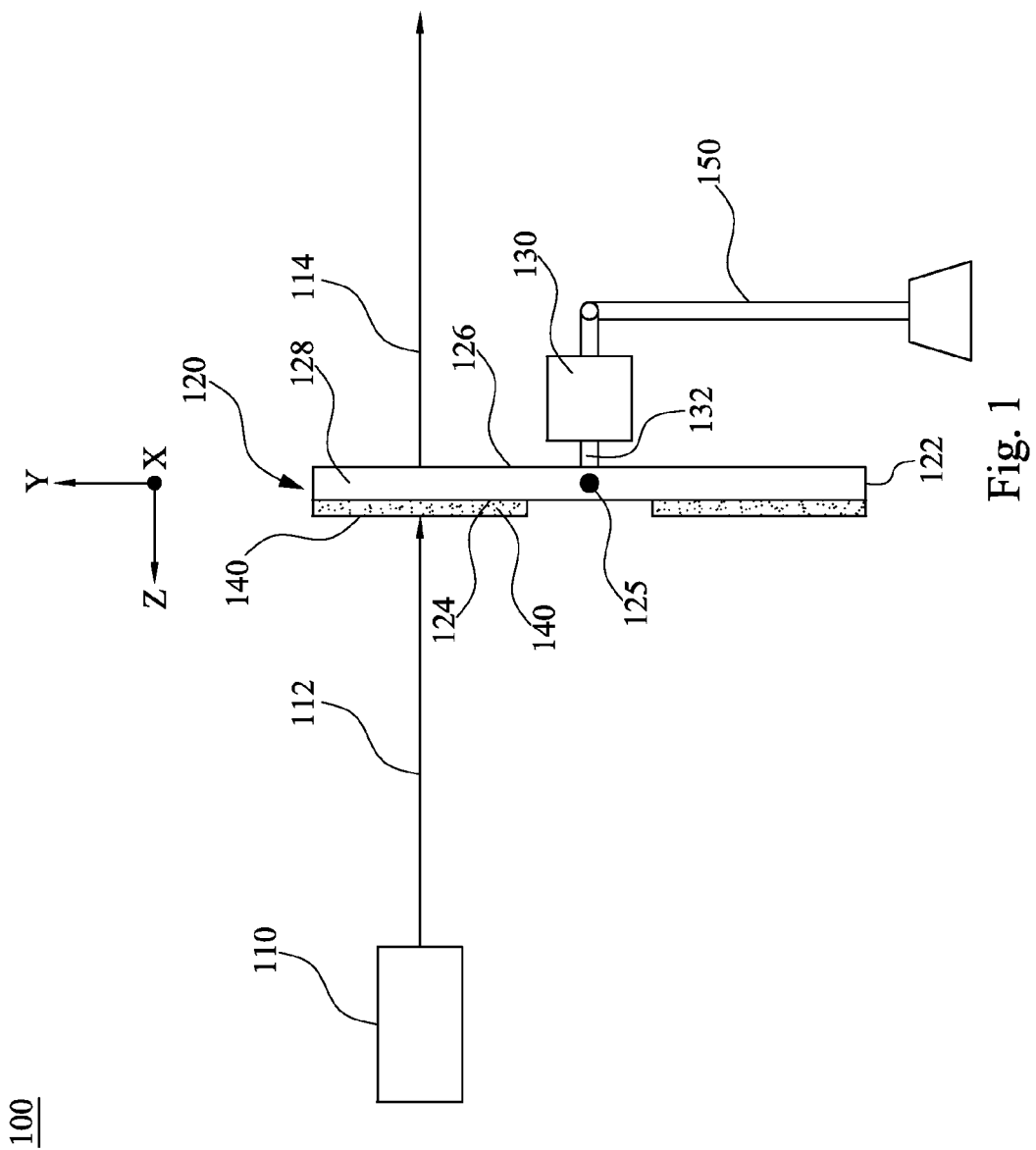
FIG. 1 is a side view of an embodiment of a light source module of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a side view of an embodiment of a light source module of the invention. The light source module 100 includes a laser light source 110 and an optical excitation device. The optical excitation device includes a wavelength converter 120 and a moving element 150. The light source module 100 utilizes the moving element 150 for moving the wavelength converter 120 relative to the laser light source 110, such that a projection path of the laser light source 110 on the wavelength converter 120 can be expanded, and a reaction area of a first light beam 112 emitted from the laser light source 110 on the wavelength converter 120 can be increased. The reaction area of the first light beam 112 is equal to a total area of a projection path the laser light beam (i.e., the first light beam 112) emitting on the wavelength converting layer 140. As a result of such expansion of the projection path of the laser light source 110, the wavelength converter 120 can be utilized more efficiently. Moreover, the energy of the laser light source 110 can be distributed on the wavelength converter 120 more uniformly, and the heat dissipating efficiency of the wavelength converter 120 can be improved.

The laser light source 110 emits the first light beam 112 having a first wavelength. The first light beam 112 provided by the laser light source 110 is emitted onto the wavelength converter 120. The wavelength converter 120 includes a wheel 122, a motor 130 connected to the wheel 122, and a wavelength converting layer 140 disposed on the wheel 122. The wheel 122 has a front surface 124, a back surface 126, and a side surface 128 connecting the front surface 124 and the back surface 126. The motor 130 is disposed at the back surface 126 of the wheel 122, and has a shaft 132. The shaft 132 of the motor 130 is connected to the wheel 122 for driving the wheel 122 to rotate. The wavelength converting layer 140 is disposed on the front surface 124 of the wheel 122. Namely, the front surface 124 of the wheel 122 is a light receiving surface for receiving the first light beam 112, and the light receiving surface is arranged substantially perpendicularly to the laser light source 110.

The laser light source 110 is disposed at a fixed position in some embodiments. The first light beam 112 provided by the laser light source 110 is emitted onto the wavelength converting layer 140 of the wavelength converter 120, and then the first light beam 112 becomes a second light beam 114 having a second wavelength after passing through the wavelength converter 120, in which the second wavelength is different from the first wavelength. The wavelength converting layer 140 can be a mixture of a wavelength converting material and a polymer adhesive. The wavelength converting layer 140 is coated on a predetermined zone of the wheel 122, in which the predetermined zone is ring-shaped with an empty portion in the center for disposing the motor 130. The wavelength converting material can be selected from the group consisting of phosphor, sensitive material, fluorescent color-conversion-media, organic complex, self-luminous pigment, quantum-dots-based material, quantum-wire-based material, quantum-well-based material, and combinations thereof.

The moving element 150 is connected to the wavelength converter 120 for moving the wavelength converter 120 relative to the laser light source 110. The moving element 150 can be a robot arm, a sliding block and a rail, a gear and a rack, or other mechanisms. Therefore, the wavelength converter 120 not only rotates relative to the laser light source 110 by the motor 130 but also moves relative to the laser light source 110 by the moving element 150. In some embodiments, the motor 130 can be integrated into the moving element 150. In other embodiments, the motor 130 and the moving element 150 can be separate elements.

When the wavelength converter 120 is only rotated rapidly by the motor 130, the projection path (e.g., the reaction area of the wavelength converter 120) is a circle with a single radius, and a line width of the circle is approximately the same as a line width of the first light beam 112. When the wavelength converter 120 is further moved relative to the laser light source 110 by the moving element 150, the projection path of the first light beam 112 on the wavelength converter 120 can be expanded to form a regular or an irregular pattern. Compared to when only rotating the wavelength converter 120, both rotating and moving the wavelength converter 120 at the same time may increase the reaction area between the first light beam 112 emitted from the laser light source 110 and the wavelength converter 120. Hence, the high energy of the laser light beam (i.e., the first light beam 112) can be distributed on the wavelength converter 120 more uniformly, thereby increasing the heat dissipating efficiency of the light source module 100. Additional details are provided below with reference to the drawings.

Figure 2:
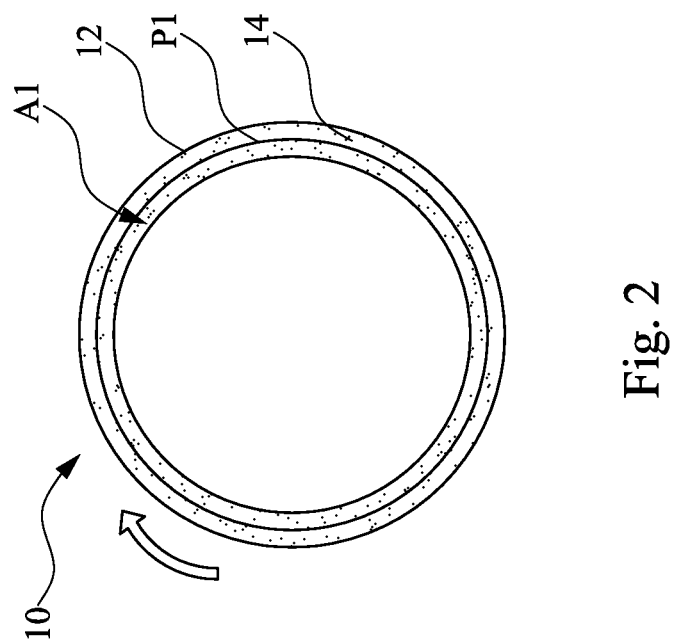
FIG. 2 is a front view of a projection path of a light source on a wavelength converter in a conventional light source module.

FIG. 2 is a front view of a projection path of a light source on a wavelength converter in a conventional light source module. In the case of the conventional wavelength converter 10, a coating area A1 of a wavelength converting layer 14 is only arranged at a circular edge of a wheel 12. A projection path P1 of the light source is a circle with a single radius. There is a first reaction area between the laser light source and the wavelength converter 10. The reaction area is a sum of the projection path P1, which is approximately the same as the perimeter of the circle.

Figure 3:
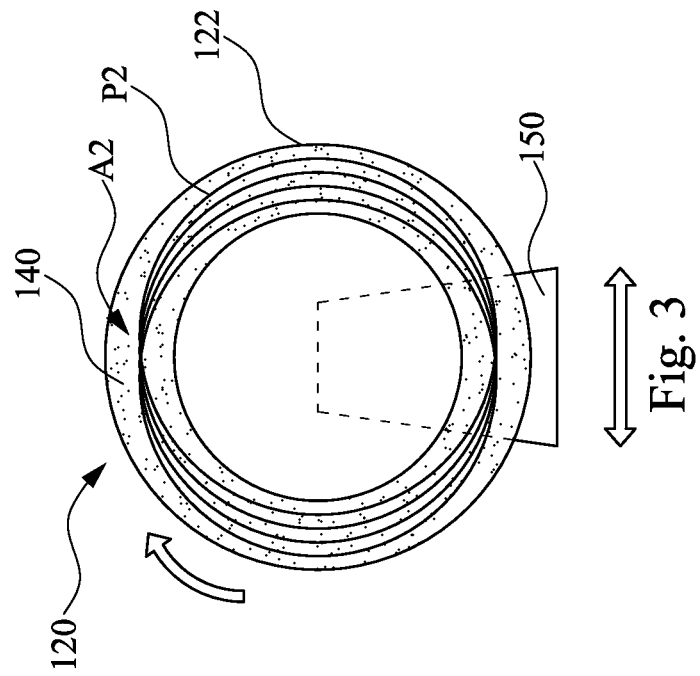
FIG. 3 is a front view of an embodiment of a projection path of a laser light source on a wavelength converter of the invention.

FIG. 3 is a front view of an embodiment of a projection path of the laser light source 110 on the wavelength converter 120 of the invention. Referring to FIGS. 1 and 3, the wavelength converter 120 is connected to the moving element 150. The wavelength converter 120 not only rotates but also moves relative to the laser light source 110. A coating area A2 of the wavelength converting layer 140 on the wheel 122 is extended inwardly from an edge of the wheel 122 to enlarge a reaction area between the first light beam 112 from the laser light source 110 and the wavelength converter 120. For example, the wavelength converter 120 is rotated and is moved left-and-right (along the x direction as indicated in FIG. 1) relative to the laser light source 110. The projection path P2 of the first light beam 112 on the wavelength converter 120 is a combination of plural circles, the resulting formation of which is similar to an ellipse. There is a second reaction area between the laser light source 110 and the wavelength converter 120, and the area of the second reaction area is a sum of the perimeter of the circles. The second reaction area is greater than the first reaction area as shown in FIG. 2. The second reaction area is smaller than the coating area A2 of the wavelength converting layer 140 on the wheel 122.

In the case of FIG. 2, there is a first reaction area between the laser light source and the wavelength converter 10 when a motor is operated and a moving element is not utilized. In contrast, in the case of the invention, with reference to FIGS. 1 and 3, there is a second reaction area between the laser light source 110 and the wavelength converter 120 when both the motor 130 and the moving element 150 are operated. The second reaction area is greater than the first reaction area, as mentioned above. Moreover, as discussed with reference to FIG. 3, the wavelength converter 120 is moved relative to the laser light source 110 by the moving element 150, and as a result, the reaction area between the first light beam 112 and the wavelength converter 120 can be enlarged to thereby distribute the energy of the laser light beam on the surface of the wheel 122 more uniformly. Ultimately, this increases the heat dissipating efficiency of the wavelength converter 120.

Moreover, the problem of damage to wavelength converting material as a result of being exposed to high temperatures can be prevented, and the area of the wheel 122 can be utilized more efficiently.

Referring back to FIG. 1, the wavelength converter 120 may be moved relative to the laser light source 110 in a variety of different ways, as long as the projection path of the first light beam 112 on the wavelength converter 120 is expanded, and is located within the coating area of the wavelength converting layer 140. The factors that determine the projection path of the first light beam 112 on the wavelength converter 120 include a moving distance of the wavelength converter 120, a moving cycle for completing a full movement of the wavelength converter 120, a radius of the wheel 122, a landing point of the first light beam 112 on the wavelength converter 120, a speed of the motor 130, an angular speed of the wavelength converter 120, and a rotation cycle of the wavelength converter 120. The projection path can be designed by adjusting these factors. A description in this regard will be provided with reference to FIG. 4A to FIG. 4E.

FIG. 4A to FIG. 4E are schematic diagrams for describing different embodiments of a projection path of the laser light source 110 on the wavelength converter 120 of the invention. With reference also to FIG. 1, it is noted that the laser light source 110 is fixed at a predetermined position and emits the first light beam 112, and the wavelength converter 120 is rotated relative to the laser light source 110. The patterns illustrated in FIG. 4A to FIG. 4E are the projection paths of the laser light source 110 projecting on the wavelength converter 120 when the wavelength converter 120 is rapidly rotated relative to the laser light source. The patterns of the projection paths are formed by projected laser points from the laser light source 110 on the wavelength converter 120.

For example, when the wavelength converter 120 is moved relative to the laser light source 110 left and right only, and the rotation cycle of the wavelength converter 120 is smaller than the movement cycle of the wavelength converter 120, the projection path P2 of the laser light source 110 on the wavelength converter 120 is in the form of a lateral ellipse, as shown in FIG. 4A.

When the wavelength converter 120 is moved relative to the laser light source 110 up and down only, and the rotation cycle of the wavelength converter 120 is smaller than the movement cycle of the wavelength converter 120, the projection path P3 of the laser light source 110 on the wavelength converter 120 is in the form of a vertical ellipse, as shown in FIG. 4B.

When the wavelength converter 120 is moved relative to the laser light source 110 both left and right and up and down, and the rotation cycle of the wavelength converter 120 is smaller than the movement cycle of the wavelength converter 120, the projection path P4 of the laser light source 110 on the wavelength converter 120 is in the form of a plurality of partially overlapping circles, as shown in FIG. 4C.

When the rotation cycle of the wavelength converter 120 is larger than the movement cycle of the wavelength converter 120, the projection path P5 of the laser light source 110 on the wavelength converter 120 is in the form of a circular zigzag pattern, as shown in FIG. 4D.

When the wavelength converter 120 is moved relative to the laser light source 110 left and right, and the rotation cycle of the wavelength converter 120 is similar to the movement cycle of the wavelength converter 120, the projection path P6 of the laser light source 110 on the wavelength converter 120 is in the form of a plurality of partially overlapping ellipses, as shown in FIG. 4E.

Generally speaking, the moving distance on a plane of the wavelength converter 120 must be smaller than a coating width of the wavelength converting layer 140, and the movement cycle of the wavelength converter 120 is not an integer multiple of the rotation cycle (i.e., is greater than or less than an integer multiple of the rotation cycle). The projection path of the laser light source 110 on the wavelength converter 120 can be expanded by such design.

Figure 5A:
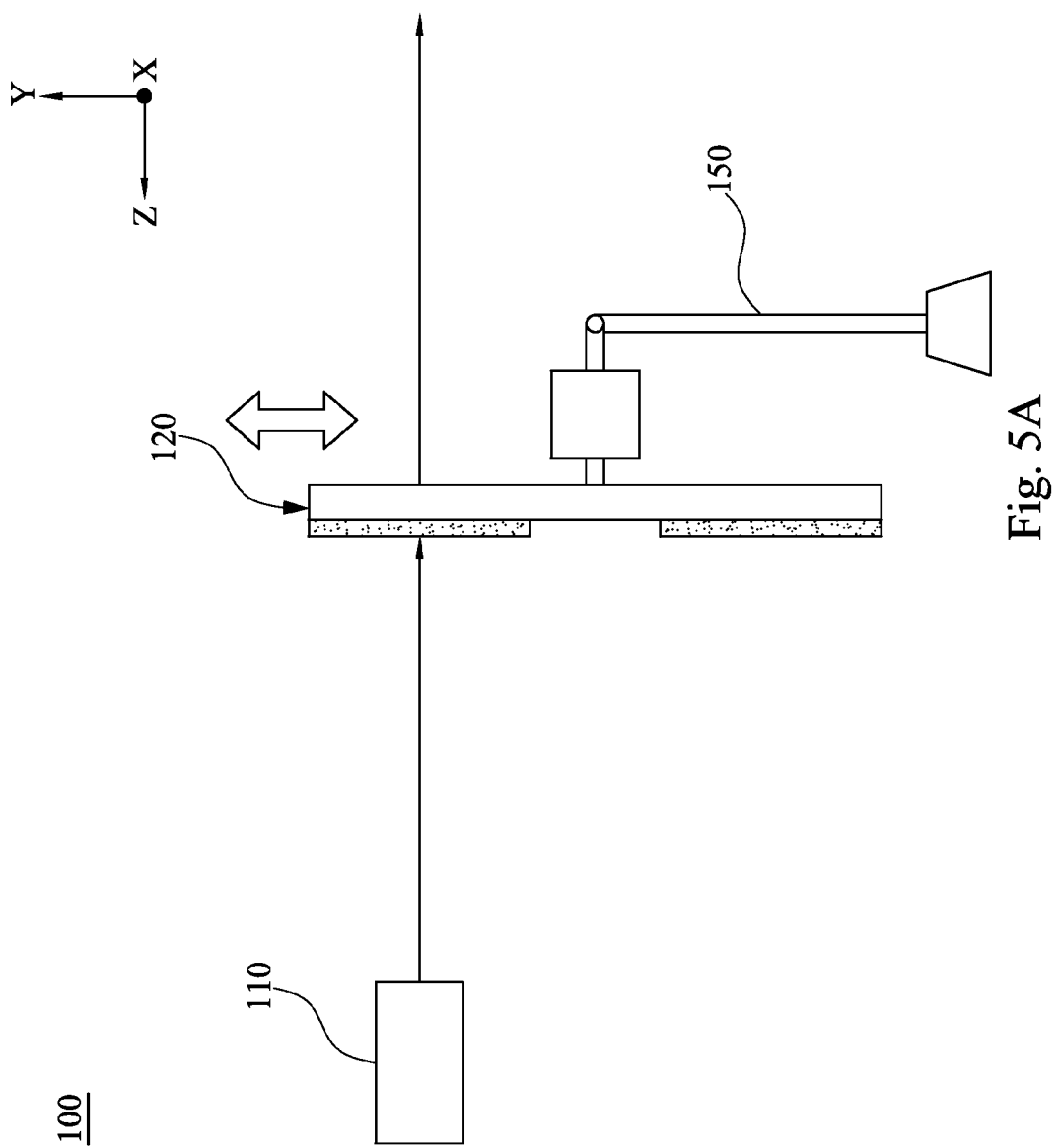

FIG. 5A to FIG. 5C are side views of different embodiments of the light source module 100 of the invention. As shown in FIG. 5A, the wavelength converter 120 is moved relative to the laser light source 110 up and down by the moving element 150, as indicated by the arrow in FIG. 5A. The moving element 150 can be a robot arm, a sliding block and a rail, a gear and a rack, or other possible mechanisms.

As shown in FIG. 5B, the wavelength converter 120 is moved relative to the laser light source 110 obliquely by the moving element 150, as indicated by the arrow in FIG. 5B. The moving element 150 can be a robot arm, a sliding block and a rail, a gear and a rack, or other possible mechanisms.

As shown in FIG. 5C, the wavelength converter 120 is swung relative to the laser light source 110 front and back vertically by the moving element 150, as indicated by the arrow in FIG. 5C. The moving element 150 can be a robot arm. The center 125 of the wheel 122 is utilized as a pivot point, and the wheel 122 is swung back and forth vertically relative to the laser light source 110 by the moving element 150 about the center 125 of the wheel 122.

Figure 5D:
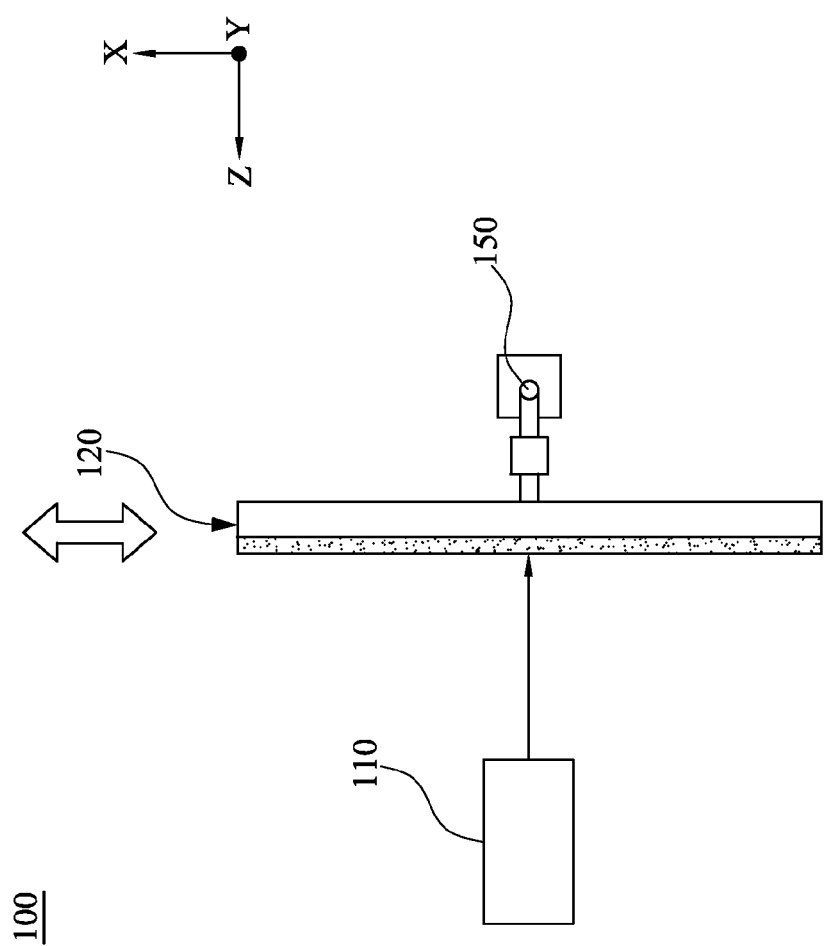

FIG. 5D and FIG. 5E are top views of different embodiments of the light source module 100 of the invention. As shown in FIG. 5D, the wavelength converter 120 is moved relative to the laser light source 110 left and right by the moving element 150, as indicated by the arrow in FIG. 5D. The moving element 150 can be a robot arm, a sliding block and a rail, a gear and a rack, or other possible mechanisms.

As shown in FIG. 5E, the wavelength converter 120 is swung relative to the laser light source 110 front and back horizontally by the moving element 150, as indicated by the arrow in FIG. 5E. The moving element 150 can be a robot arm. The center 125 of the wheel 122 is utilized as a pivot point, and the wheel 122 is swung back and forth horizontally relative to the laser light source 110 by the moving element 150 about the center 125 of the wheel 122.

As is evident from the above description, the motor 130 is utilized for providing a first moving mode to the wheel 122, and the moving element 150 is utilized for providing a second moving mode to the wavelength converter 120. When the wheel 122 is in the first moving mode, the wheel 122 is rotated relative to the laser light source 110 by the motor 130, which is connected to the center 125 of the wheel 122. When the wavelength converter 120 is in the second moving mode, the wavelength converter 120 is moved relative to the laser light source 110. Different ways in which the second moving mode may be realized are shown by way of nonlimiting examples in FIG. 5A to FIG. 5E.

Generally speaking, the wavelength converter 120 can be swung relative to the laser light source 110. Alternatively, assuming that a light emitting direction of the laser light source 110 is in a z-axis direction, the center 125 of the wheel 122 is moved at least on an x-y plane, which is perpendicular to the z axis. Any possible design excluding that in which the wavelength converter 120 only moves front and back (in the z-axis direction) relative to the laser light source 110, and the movement cycle of the wavelength converter is not an integer multiple of the rotation cycle can be utilized for expanding the projection path of the laser light source 110 on the wavelength converter 120.

Figure 6:
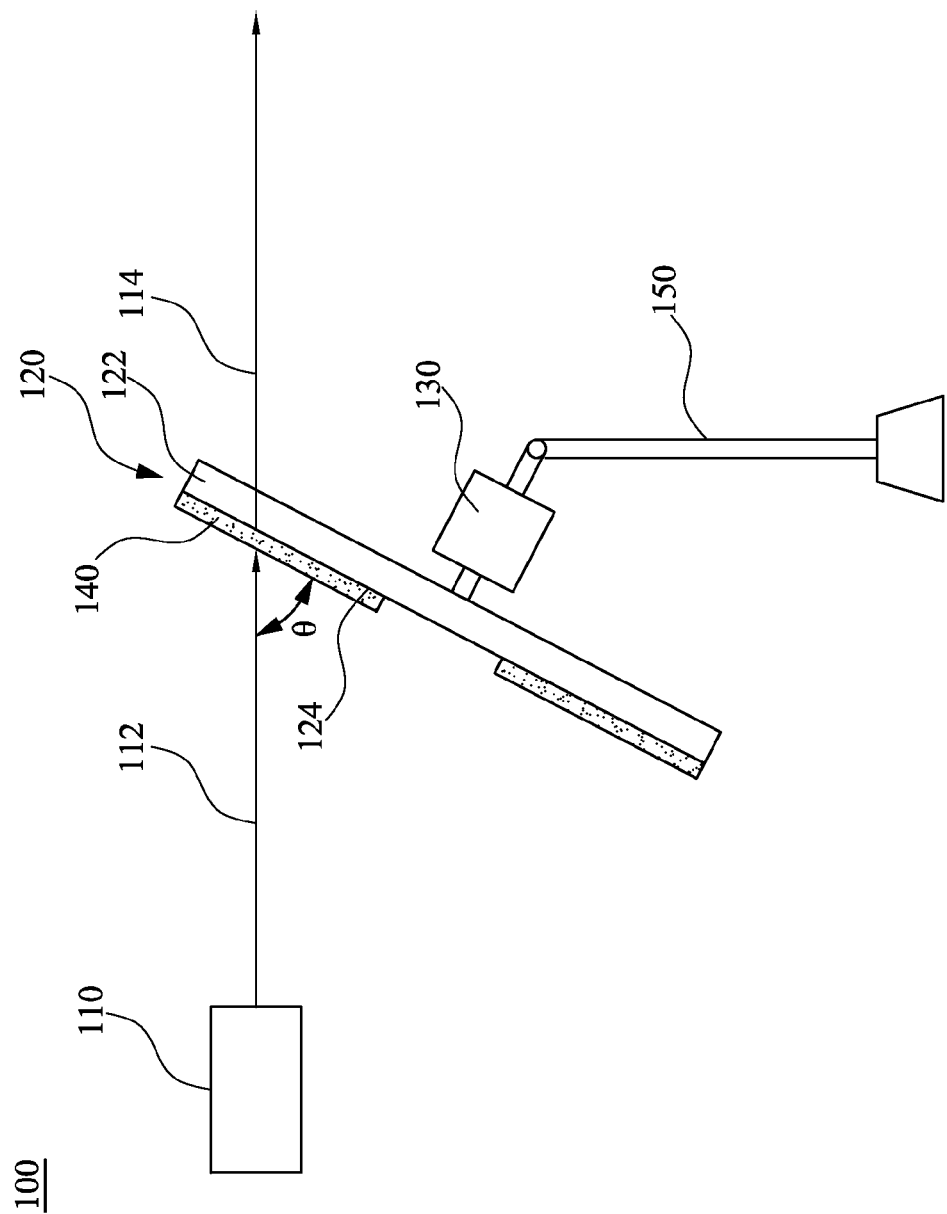
FIG. 6 is a side view of another embodiment of the light source module of the invention.

FIG. 6 is a side view of another embodiment of the light source module of the invention. The difference between this and previous embodiments is that the wavelength converter 120 is arranged obliquely to the laser light source 110. The front surface 124 for receiving the light is not arranged perpendicularly to the light emitting direction of the laser light source 110 (i.e., the front surface 124 is arranged obliquely to the light emitting direction of the laser light source 110). There is an acute angle θ defined between the first light beam 112 emitted from the laser light source 110 and the wavelength converter 120. In order to maintain the projection path of the laser light source 110 in the coating area of the wavelength converting layer 140, the moving distance of the wavelength converter 120 is preferably smaller than d*sin θ, in which d represents the coating width of the wavelength converting layer 140. The relative movement between the wavelength converter 120 and the obliquely arranged laser light source 110 is the same as that described with reference to FIG. 5A to FIG. 5E.

Figure 7:
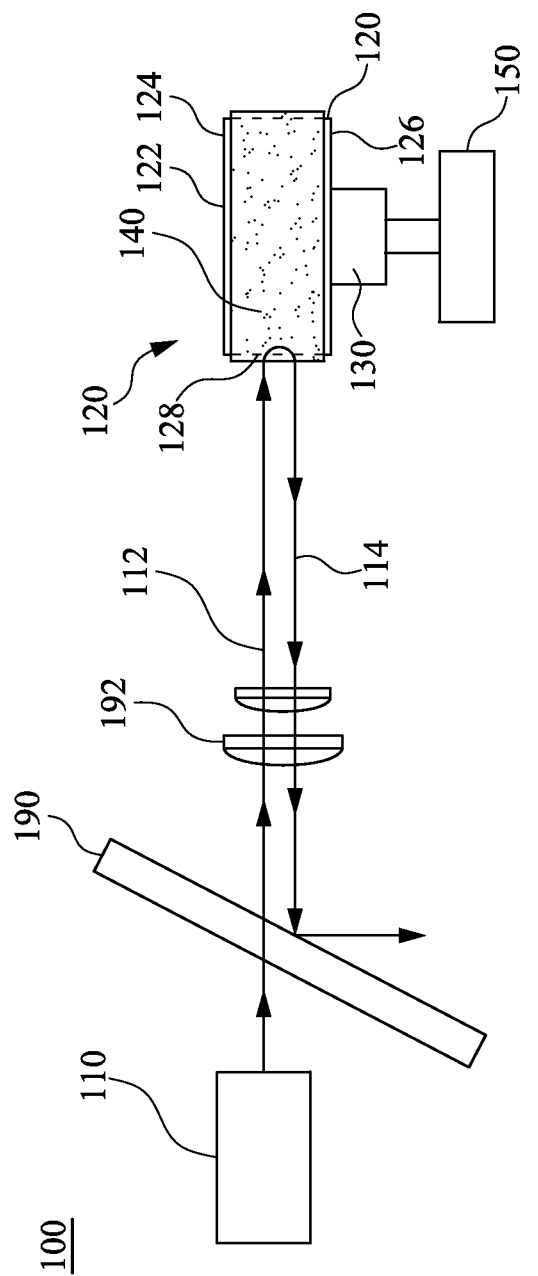
FIG. 7 is a top view of yet another embodiment of the light source module of the invention.

FIG. 7 is a top view of yet another embodiment of the light source module of the invention. The difference between this and previous embodiments is that the light receiving surface is the side surface 126. More particularly, the wheel 122 of the wavelength converter 120 has the front surface 124, the back surface 126, and the side surface 128 connecting the front surface 124 and the back surface 126. The motor 130 is connected to the back surface 126, and the wavelength converting layer 140 is coated on the side surface 128 of the wheel 122. The axis of the motor 130 is vertical to the light emitting direction of the laser light source 110. The first light beam 112 provided by the laser light source 110 is emitted onto the wavelength converting layer 140 coated on the side surface 128 of the wheel 122. Hence, in this embodiment, the side surface 128 is the light receiving surface of the wheel 122.

The wavelength converter 120 in this embodiment is a reflective type wavelength converter. A splitter 190 is disposed between the laser light source 110 and the wavelength converter 120. The first light beam 112 provided by the laser light source 110 passes through the splitter 190 and emits onto the side surface 128 of the wavelength converter 120. The first light beam 112 having the first wavelength is emitted onto the wavelength converting layer 140 and becomes a second light beam 114 having a second wavelength. The second light beam 114 is reflected by the wheel 122 and is then emitted onto the splitter 190. The second light beam 114 is reflected to an imaging unit by the splitter 190. Lens groups 192 can be disposed between the laser light source 110 and the wavelength converter 120 for adjusting the light paths of the first light beam 112 and the second light beam 114.

In this embodiment, if the wavelength converter 120 is only moved relative to the laser light source 110 back and forth or up and down, the projection path of the first light beam 112 cannot be expanded. Therefore, in the light source module 100 using the reflective type wavelength converter 120, the wavelength converter 120 is moved at least left and right relative to the laser light source 110 in order to expand the projection path of the first light beam 112 on the wavelength converting layer 140. Similarly, in order to maintain the projection path of the laser light source 110 on the wavelength converter 120 in the coating area of the wavelength converting layer 140, the lateral moving distance of the wavelength converter 120 must be smaller than the coating width of the wavelength converting layer 140.

Figure 8:
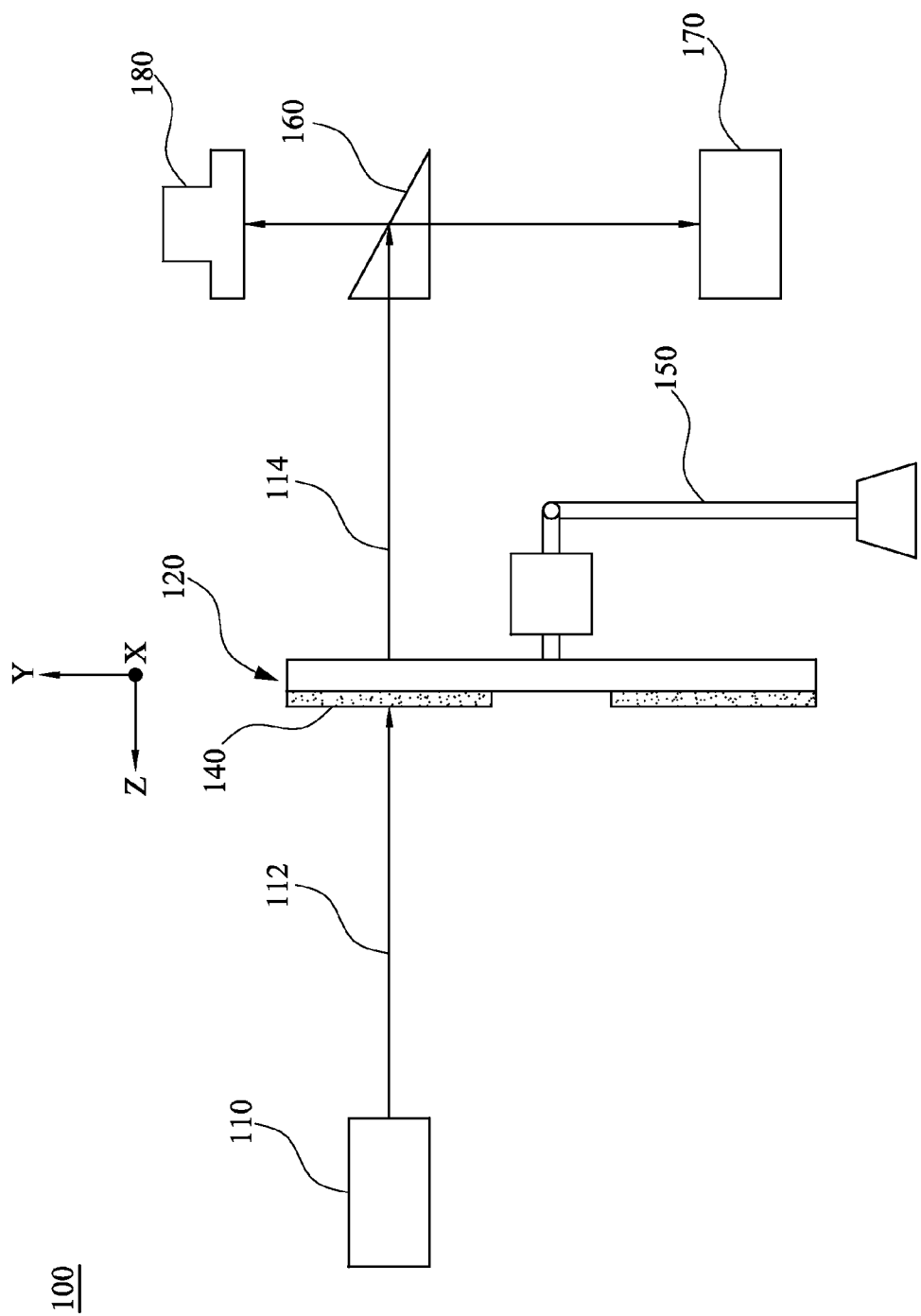
FIG. 8 is a schematic diagram of an embodiment of a projector using the light source module of the invention.

FIG. 8 is a schematic diagram of an embodiment of a projector using the light source module of the invention. The light source module 100 described in any one of the previous embodiments can be utilized in a projector. The light source module 100 includes the laser light source 110 and the optical excitation device. The wavelength converter 120 in this embodiment is a transmission type wavelength converter. The first light beam 112 having the first wavelength provided by the laser light source 110 passes through the wavelength converting layer 140 on the wavelength converter 120 and becomes the second light beam 114 having the second wavelength. The second light beam 114 is further reflected toward an imaging unit 170 by a prism 160 for subsequent processing by the imaging unit 170. The second light beam 114 can be a primary light or a mixed light. The second wavelength of the second light beam 114 is determined according to a composition of the wavelength converting material of the wavelength converting layer 140. The second light beam 114 having the second wavelength is reflected by the prism 160 and enters the imaging unit 170. The imaging unit 170 processes the second light beam 114 and provides an image. The light of the image is sent to a projecting unit 180 which projects the light of the image onto a screen. The laser light source 110 is disposed at a fixed position for emitting the first light beam 112 along a predetermined direction. As a result, the light paths of the first light beam 112 and the second light beam 114 are fixed, and the prism 160, the imaging unit 170 and the projecting unit 180 can be arranged without the use of special circuit designs.

In the light source module 100, the wavelength converter 120 is moved relative to the laser light source 110, thereby expanding the projection path of the laser light source 110 on the wavelength converting layer 140. As a result, the reaction area between the first light beam 112 provided by the laser light source 110 and the wavelength converting layer 140 can be enlarged, and the energy carried by the first light beam 112 provided by the laser light source 110 can be distributed on the wheel 122 equally to thereby increase the thermal dissipating efficiency of the wavelength converter 120. Hence, a situation in which the wavelength converting layer 140 is damaged due to high temperatures can be prevented.

According to above embodiments, the projection path of the laser light source on the wavelength converter can be expanded by moving the wavelength converter relative to the laser light source. As a result, the reaction area between the laser light source and the wavelength converter can be enlarged, and the wavelength converting layer can be utilized more efficiently. Moreover, the energy carried by the laser light beam can be distributed on the wavelength converter more equally, thereby increasing the thermal dissipating efficiency of the wavelength converter, and preventing a situation in which the wavelength converting layer is damaged due to high temperatures.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical excitation device for exciting a laser light source, wherein the laser light source emits a first light beam having a first wavelength, the optical excitation device comprising:

a wavelength converter comprising:
        a wheel;
        a motor connected to the wheel for driving the wheel to rotate relative to the laser light source; and
        a wavelength converting layer disposed on a light receiving surface of the wheel for converting the first light beam with the first wavelength into a second light beam with a second wavelength; and
    a moving element connected to the wavelength converter for moving the wavelength converter relative to the laser light source, wherein there is a first reaction area between the laser light source and the wavelength converter when the motor is operated and the moving element is not operated, there is a second reaction area between the laser light source and the wavelength converter when both the motor and the moving element are operated, and the second reaction area is greater than the first reaction area.

2. The optical excitation device of claim 1, wherein a projection path of the laser light source on the wavelength converter is located within a coating area of the wavelength converting layer.

3. The optical excitation device of claim 1, wherein the wheel comprises a front surface, a back surface, and a side surface connecting the front surface and the back surface, the motor is disposed at the back surface, and the light receiving surface is the front surface.

4. The optical excitation device of claim 3, wherein the light receiving surface is arranged perpendicular to a light emitting direction of the laser light source.

5. The optical excitation device of claim 3, wherein the light receiving surface is arranged obliquely to a light emitting direction of the laser light source.

6. The optical excitation device of claim 3, wherein the moving element is a robot arm for swinging the wheel relative to the laser light source.

7. The optical excitation device of claim 1, wherein the wheel comprises a front surface, a back surface, and a side surface connecting the front surface and the back surface, the motor is disposed at the back surface, and the light receiving surface is the side surface.

8. The optical excitation device of claim 1, wherein the wavelength converter has a rotation cycle and a movement cycle, and the movement cycle is less than or greater than an integer multiple of the rotation cycle.

9. The optical excitation device of claim 1, wherein a light emitting direction of the laser light source is along a z-axis direction, and a center of the wheel is at least moved on an x-y plane.

10. A projector utilizing the optical excitation device of claim 1.

11. A light source module comprising:

a laser light source for emitting a first light beam having a first wavelength;
    a wavelength converter comprising:
        a wheel;
        a motor connected to the wheel for driving the wheel to rotate relative to the laser light source; and
        a wavelength converting layer disposed on a light receiving surface of the wheel for converting the first light beam with the first wavelength into a second light beam with a second wavelength; and
    a moving element connected to the wavelength converter for moving the wavelength converter relative to the laser light source, wherein there is a first reaction area between the laser light source and the wavelength converter when the motor is operated and the moving element is not operated, there is a second reaction area between the laser light source and the wavelength converter when both the motor and the moving element are operated, and the second reaction area is greater than the first reaction area.

12. The light source module of claim 11, wherein a projection path of the laser light source on the wavelength converter is located within a coating area of the wavelength converting layer.

13. The light source module of claim 11, wherein the wheel comprises a front surface, a back surface, and a side surface connecting the front surface and the back surface, the motor is disposed at the back surface, and the light receiving surface is the front surface.

14. The light source module of claim 13, wherein the light receiving surface is arranged perpendicular to a light emitting direction of the laser light source.

15. The light source module of claim 13, wherein the light receiving surface is arranged obliquely to a light emitting direction of the laser light source.

16. The light source module of claim 13, wherein the moving element is a robot arm for swinging the wheel relative to the laser light source.

17. The light source module of claim 11, wherein the wheel comprises a front surface, a back surface, and a side surface connecting the front surface and the back surface, the motor is disposed at the back surface, and the light receiving surface is the side surface.

18. The light source module of claim 11, wherein the wavelength converter has a rotation cycle and a movement cycle, and the movement cycle is less than or greater than an integer multiple of the rotation cycle.

19. The light source module of claim 11, wherein a light emitting direction of the laser light source is along a z-axis direction, and a center of the wheel is at least moved on an x-y plane.

20. A projector utilizing the light source module of claim 11.

* * * * *